United States Patent
Krishnamurthy et al.

(10) Patent No.: US 8,787,510 B2
(45) Date of Patent: Jul. 22, 2014

(54) CHANNEL SELECTION EXPLOITING MULTIPLE OBSERVATIONS OF THE CHANNEL DELAY SPREAD

(75) Inventors: Sandeep Krishnamurthy, Arlington Heights, IL (US); Colin Frank, Park Ridge, IL (US); Kenneth Stewart, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 688 days.

(21) Appl. No.: 12/649,611

(22) Filed: Dec. 30, 2009

(65) Prior Publication Data

US 2010/0172399 A1     Jul. 8, 2010

Related U.S. Application Data

(60) Provisional application No. 61/141,873, filed on Dec. 31, 2008.

(51) Int. Cl.
*H04B 1/10* (2006.01)
(52) U.S. Cl.
USPC ............................ 375/350; 375/229; 375/343
(58) Field of Classification Search
CPC ........... H04B 17/0047; H04B 25/0225; H04L 25/0202; H04L 25/0212; H04L 25/0216
USPC ................. 375/224, 229, 232, 233, 343, 350; 708/300, 322, 323
See application file for complete search history.

(56) References Cited

U.S. PATENT DOCUMENTS

| | | | |
|---|---|---|---|
| 5,644,597 A * | 7/1997 | Ueda .............................. | 375/232 |
| 6,373,888 B1 | 4/2002 | Lindoff | |
| 6,907,092 B1 | 6/2005 | Yakhnich et al. | |
| 6,983,125 B2 | 1/2006 | Smee et al. | |
| 7,085,317 B2 | 8/2006 | Malladi et al. | |
| 7,151,948 B2 * | 12/2006 | Ishii et al. ..................... | 455/522 |
| 2004/0127164 A1 * | 7/2004 | Mondragon-Torres et al. ............... | 455/67.11 |
| 2004/0213363 A1 * | 10/2004 | Bottomley et al. ........... | 375/343 |
| 2005/0111539 A1 * | 5/2005 | Tsuchiya ...................... | 375/229 |

OTHER PUBLICATIONS

Chen Sanping, S. Mills, "A binary Markov process model for random testing," IEEE Transactions on Software Engineering, pp. 218-223, vol. 22, Issue: 3, Mar. 1996.

* cited by examiner

*Primary Examiner* — Betsy Deppe
(74) *Attorney, Agent, or Firm* — Leydig, Voit & Mayer, Ltd.

(57) ABSTRACT

A method, a mobile system, and a user device for determining a delay spread are disclosed. A memory 306 may store a compound test value based on a multiburst history. The multiburst history may be a set of power delay profile decisions. A processor 304 may create a short power delay profile channel estimate and a long power delay profile channel estimate. The processor 304 may select a chosen power delay profile channel estimate based on the compound test value.

20 Claims, 7 Drawing Sheets

104

400

*500*

CHANNEL SELECTION EXPLOITING MULTIPLE OBSERVATIONS OF THE CHANNEL DELAY SPREAD

CROSS REFERENCE TO RELATED APPLICATIONS

The present application claims priority from U.S. Provisional Patent Application No. 61/141,873, filed Dec. 31, 2008, the contents of which are incorporated herein by reference in its entirety.

FIELD OF THE INVENTION

The present invention relates to a method and system for selecting a channel for data transmission. The present invention further relates to identifying a delay spread to properly select.

INTRODUCTION

A mobile system may access a network via a network base station. The mobile system may decode a data transmission from the network base station. To facilitate communication, the mobile system may determine a power delay profile (PDP) for the propagation channel over which the data transmission is received. The PDP may denote the signal intensity of the data transmission as a function of time delay. The mobile system may choose between PDPs representing a typical urban (TU) profile, a hilly terrain (HT) profile, a rural area (RA) profile, or other terrain profiles. The mobile system may use the PDP to calculate a tap, or a coefficient or delay pair, for the feedforward and feedback filters used in accordance with minimum mean square error criterion.

SUMMARY OF THE INVENTION

A method, a mobile system, and a user device for determining a delay spread are disclosed. A memory may store a compound test value based on a multiburst history. The multiburst history may be a set of power delay profile decisions. A processor may create a short power delay profile channel estimate and a long power delay profile channel estimate. The processor may select a chosen power delay profile channel estimate based on the compound test value.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a mobile system, and a user device for determining a delay spread are disclosed. A memory may store a compound test value based on a multiburst history. The multiburst history may be a set of power delay profile decisions gathered over many transmission bursts. A processor may create channel estimates for a short power delay profile channel estimate and a long power delay profile channel estimate. The processor may compute the channel estimation error for these short and long power delay profile channel estimates. The processor may compute a compound test value from the channel estimation errors. The processor may select a chosen power delay profile channel estimate based on the compound test value.

Figure 1:
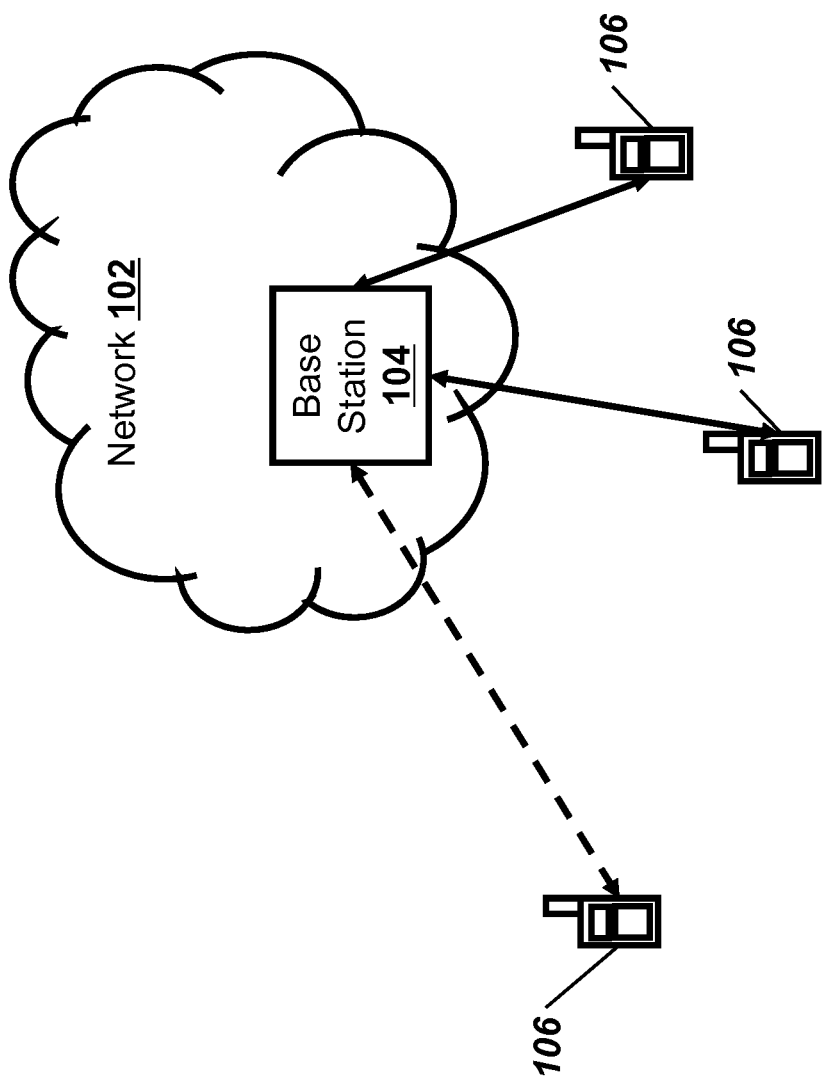
FIG. 1 illustrates one embodiment of a communication system.

FIG. 1 illustrates one embodiment of a communication system 100. The communication system 100 may include a network 102, base station 104, and a mobile device, such as a user device 106. Various communication devices may exchange data or information through the network 102. The network 102 may be an enhanced general packet radio service (EGPRS) network, WiMAX network, or other type of telecommunication network. A network entity, such as the base station 104, may connect the mobile device 106 to the network 102. For one embodiment, the base station 104 may be a distributed set of servers in the network. The mobile device 106 may be one of several types of handheld or mobile devices, such as, a mobile phone, a laptop, or a personal digital assistant (PDA). For one embodiment, the mobile device 106 may be an EGPRS capable device, a WiFi® capable device, a WiMax® capable device, or other wireless devices. The mobile device 106 may move within the range of the base station 104, affecting the quality of the channel to transmit data. These changes to the channel may be compensated for by a feedback or feedforward filter with settings based on channel estimates with length equal to that of the chosen power delay profile (PDP).

Figure 2:
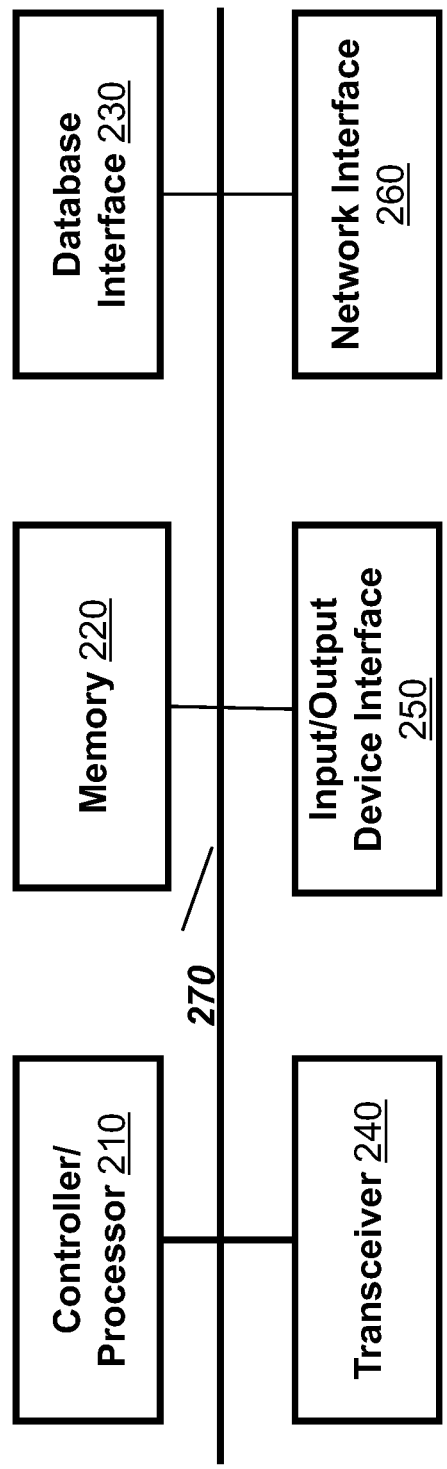
FIG. 2 illustrates a possible configuration of a computing system to act as a base station.

FIG. 2 illustrates a possible configuration of a computing system to act as a base station 104. The base station 104 may include a controller/processor 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain any formatting data to connect the mobile device 106 to the network 102.

The transceiver 240 may create a data connection with the mobile device. The transceiver may use a transmitter array to create a downlink and uplink control channel between the base station 104 and the mobile device 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 102. The network connection interface 260 may be used to connect a client device to a network. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station 104 may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
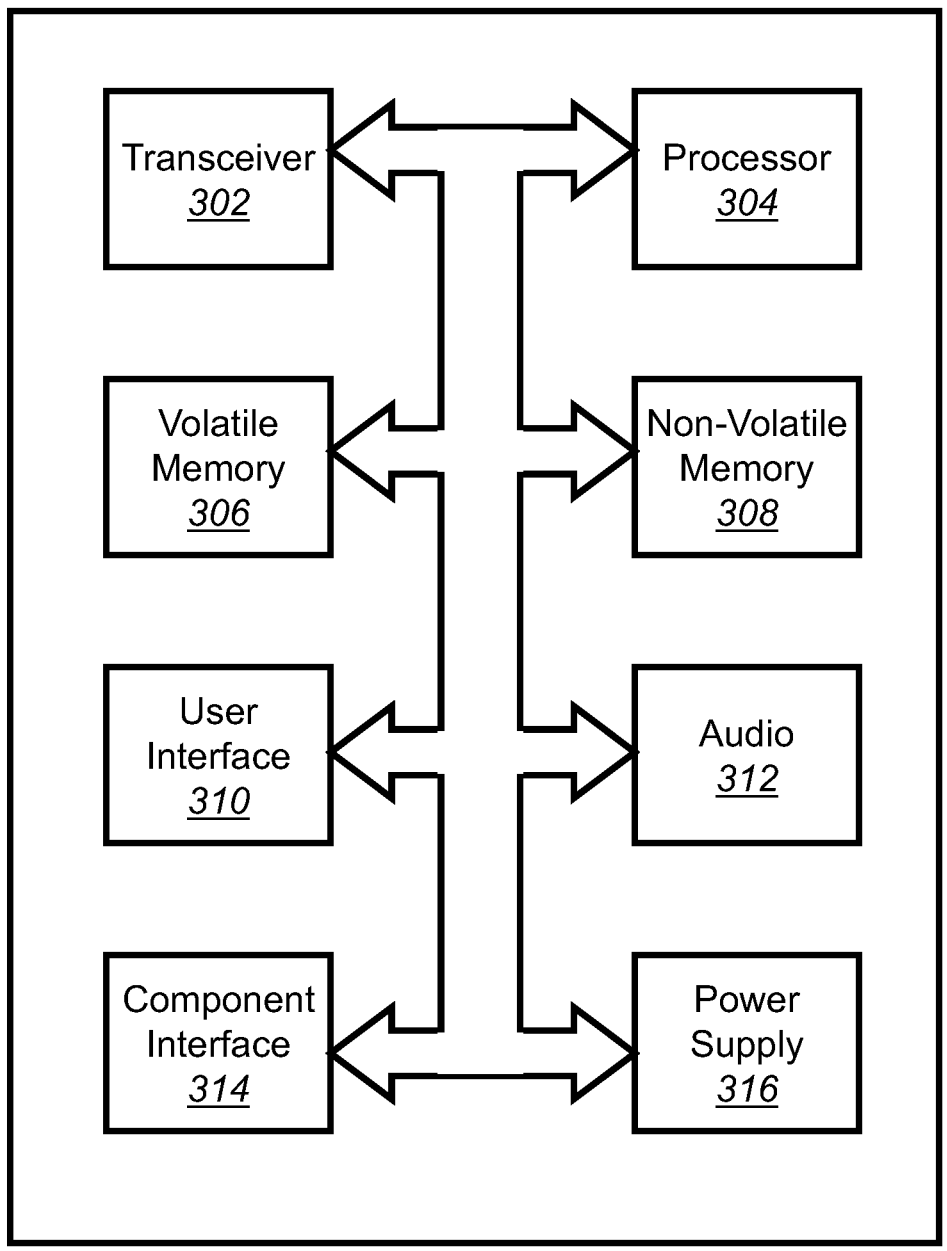
FIG. 3 illustrates in a block diagram one embodiment of the user communication device.

FIG. 3 illustrates in a block diagram one embodiment of a mobile system 300, or terminal, capable of acting as a user device 106. The mobile system 300 may be capable of accessing the information or data stored in the network 102. For some embodiments of the present invention, the mobile system 300 may also support one or more applications for performing various communications with the network 102. The mobile system 300 may be a handheld device, such as, a mobile phone, a laptop, or a personal digital assistant (PDA). For some embodiments of the present invention, the mobile system 300 may be an EGPRS capable device, a WiFi® capable device, or other type of device which may be used to access the network 102 for data or for voice by using VOIP.

The mobile system 300 may include a transceiver 302, which is capable of sending and receiving data over the network 102. The mobile system 300 may include a processor 304 that executes stored programs. The mobile system 300 may also include a volatile memory 306 and a non-volatile memory 308 which are used by the processor 304. The mobile system 300 may include a user input interface 310 that may comprise elements such as a keypad, display, touch screen, and the like. The mobile system 300 may also include a user output device that may comprise a display screen and an audio interface 312 that may comprise elements such as a microphone, earphone, and speaker. The mobile system 300 also may include a component interface 314 to which additional elements may be attached, for example, a universal serial bus (USB) interface. Finally, the mobile system 300 may include a power supply 316.

The channel PDP, or the "effective" length of the channel impulse response, in both uplink and downlink, may be a function of the scatter geometry in the cell to the extent that the radio propagation path affects the PDP. The instantaneous channel realization may change as the mobile system moves within a cell. However, the rate of change of channel PDP may be much slower, as the PDP may be characterized by a slow changing scatterer geometry. Individual inferences on the channel PDP may be made within the coherence time of the PDP and combined to form an inference that is much more reliable than the individual inferences. The PDP coherence time may be greater than 200 milliseconds.

In a binary hypothesis test with certain detection error probabilities for both hypotheses based on observed data, with multiple independent or weakly correlated observations, the user device 106 may combine the observations to improve the correct detection probability of the hypotheses. For the binary hypothesis testing case, the user device 106 may employ a simple majority decision rule for choosing between the alternatives, choosing the alternative that has the most favorable decisions. The test decision may be based on the realization of a real-valued random variable. The mobile system 300 may apply a historical archive of decisions between PDPs to select an appropriate PDP channel estimate for a minimum mean squared error (MMSE)—decision feedback equalizer (DFE), a least squares interference cancellation (LSIC) equalizer, a hybrid LSIC equalizer, or other equalizers.

An EGPRS handset may use a MMSE-DFE solution for octal phase shift keying (8PSK) equalization. The user device 106 may obtain an estimate of the channel impulse response of the signal at a set symbol rate, such as a 270.83 kilosymbols per second. The delay spread of the channel, which determines the length of the "true" channel response, may be dependent on the scatterer geometry, such as a hilly terrain (HT) profile, a rural area (RA) profile, a typically urban (TU) profile, or other terrain profiles. For example, the TU profile may correspond to approximately three to four taps at the symbol rate, and the HT profile may correspond to approximately six to seven taps.

Figure 4:
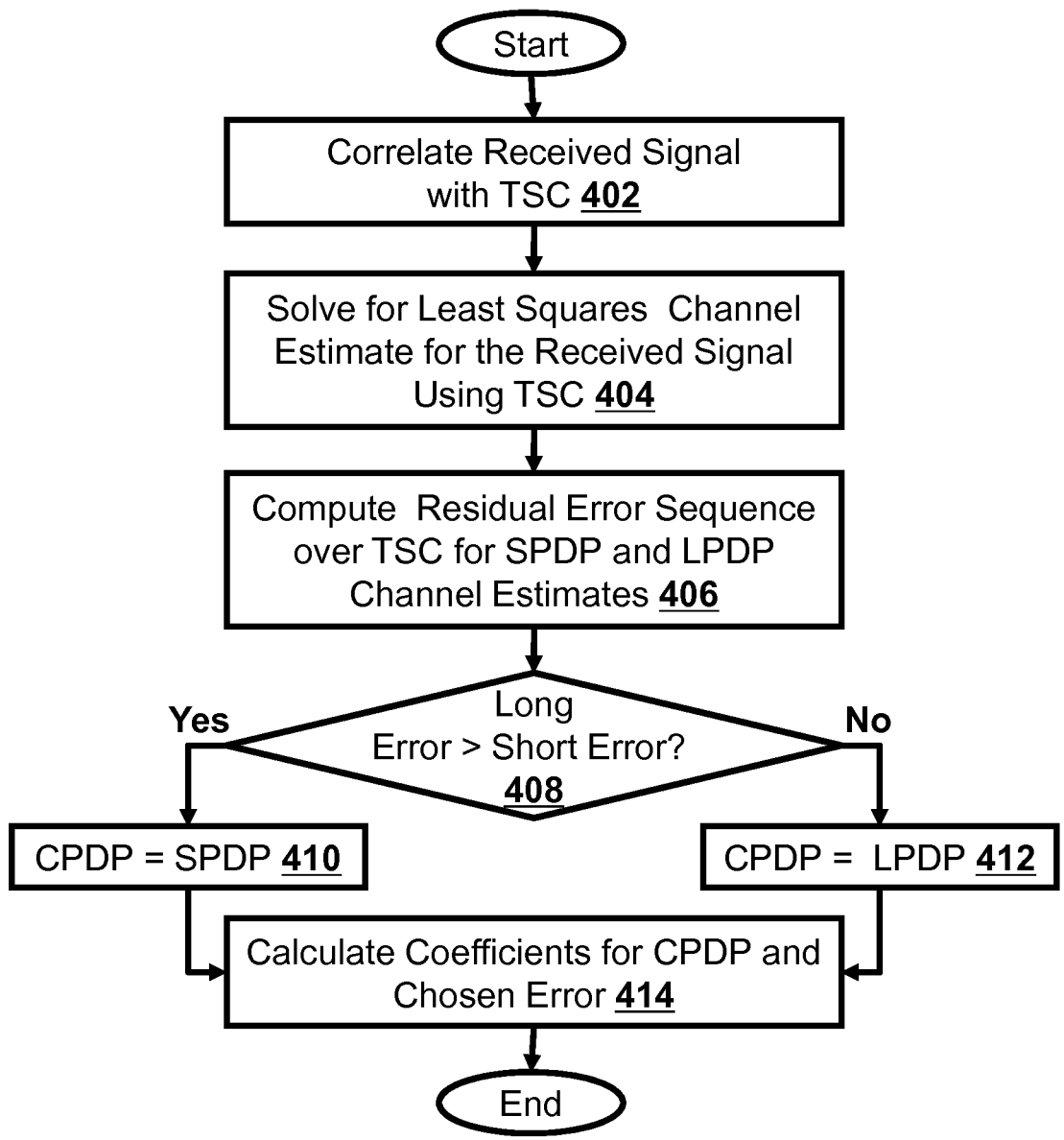
FIG. 4 illustrates, in a flowchart, one embodiment of a method for determining a power delay profile for use with a minimum mean squared error-decision feedback equalizer.

FIG. 4 illustrates, in a flowchart, one embodiment of a method 400 for determining a power delay profile to be used to select the length of the channel estimate used with the MMSE—DFE equalizer. The user device 106 may generate two estimates of the channel response for two hypothesized channel lengths, such as six taps or nine taps. The user device 106 may amass a historical multiburst set of PDP decisions. The PDP decisions may be between a long test PDP and a short test PDP. The user device 106 may weight a PDP decision in the multiburst history. The long test PDP may be a HT profile and the short test PDP may be a TU profile.

The user device 106 may correlate a training sequence code (TSC) to a received signal to estimate a short channel tap estimates, creating a short PDP (SPDP) (Block 402). The TSC may be a set of symbols used to both estimate the channel and maintain timing and equalize the channel. The user device 106 may execute a least squares estimate on the received signal to determine the long channel tap estimates, creating a long PDP (LPDP) (Block 404). The user device 106 may compute the residual error sequence over TSC for the SPDP and the LPDP channel estimates (Block 406). The user device 106 may select a chosen power delay profile based on the compound test value. If the normalized squared residual error for the LPDP channel estimate is greater than the normalized squared residual error for the SPDP channel estimate (Block 408), the user device 106 sets the SPDP as the chosen PDP (CPDP) channel estimate (Block 410). If the normalized squared residual error for the LPDP channel estimate is not greater than the normalized squared residual error for the SPDP channel estimate (Block 408), the user device 106 sets the LPDP as the CPDP (Block 412). The user device 106 may then use the CPDP and the corresponding channel estimate and error sequence to calculate the coefficients for the feed-forward and the feedback filters in accordance with the MMSE criterion (Block 414).

For both the correlation method and the least-squares method for estimating the channel response, the user device 106 may make an explicit assumption on the length of the channel response prior to channel estimation. The quality of the channel estimate and the performance of the equalizer may depend on the channel length assumption. An incorrect channel length assumption may significantly degrade the equalizer performance relative to the correct channel length. For example, for the least-squares channel estimate, the least-squares error associated with the channel estimate measured over the TSC may decrease monotonically with the hypothesized channel length, even though the channel estimation error may generally increase as the hypothesized channel length increases beyond the length of the channel impulse response.

Figure 5:
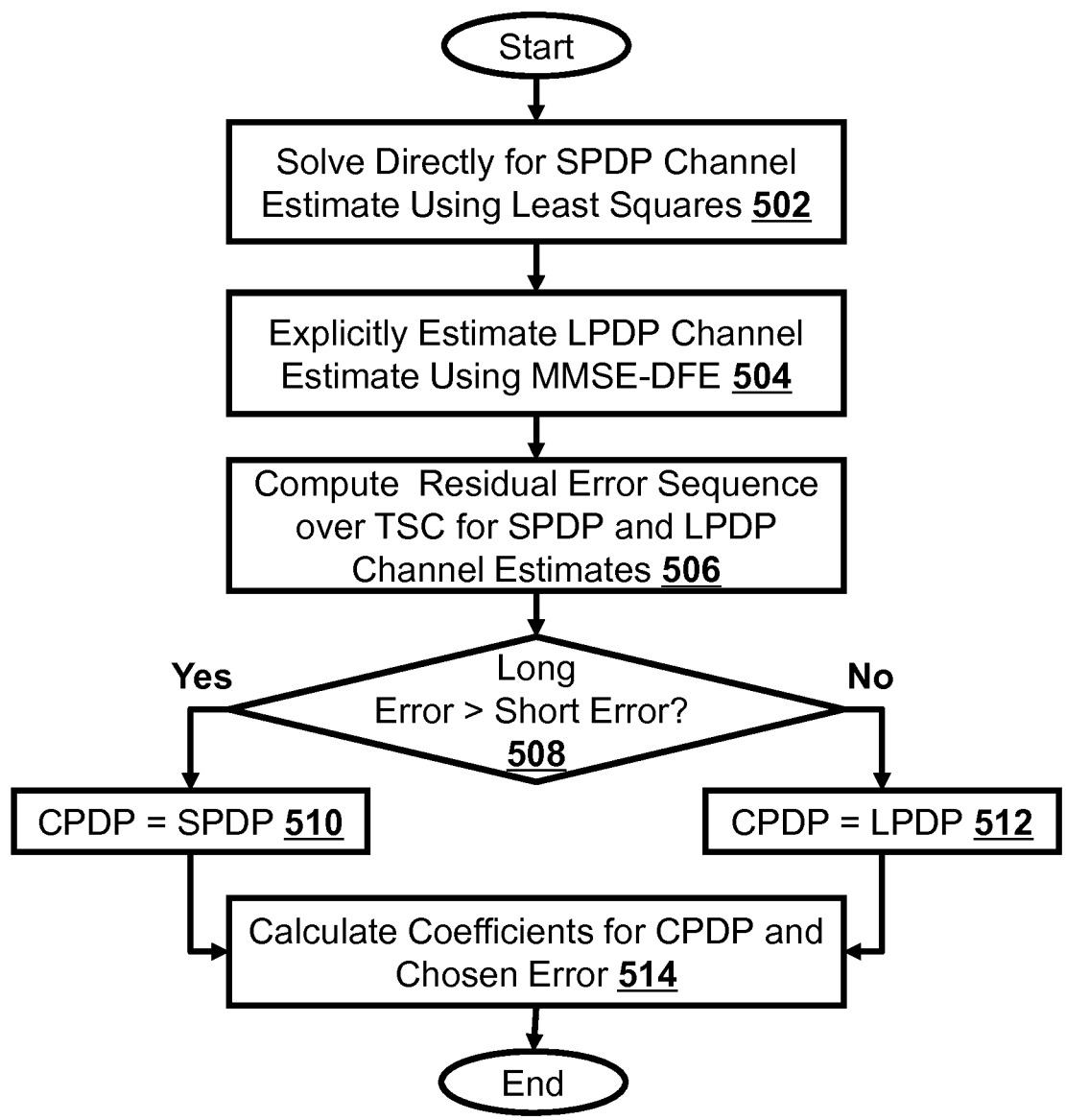
FIG. 5 illustrates, in a flowchart, one embodiment of a method for determining a power delay profile for use with a hybrid least squares interference cancellation equalizer.

FIG. 5 illustrates, in a flowchart, one embodiment of a method 500 for determining a power delay profile using a hybrid LSIC equalizer. A user device 106 using a hybrid LSIC equalizer for single antenna 8PSK equalization may have superior interference rejection capabilities relative to the MMSE-DFE. The user device 106 may correlate a TSC to a received signal to solve directly for a short channel tap estimates, creating a SPDP (Block 502). The user device 106 may execute a least squares computation on the received signal to determine the long channel tap estimates, creating a LPDP (Block 504). The user device 106 may compute the residual error sequence over TSC for the SPDP and the LPDP channel estimates (Block 506). The user device 106 may select a chosen power delay profile based on the compound test value. If the normalized squared residual error for the LPDP channel estimate is greater than the normalized squared residual error for the SPDP channel estimate (Block 508), the user device 106 sets the SPDP as the CPDP channel estimate (Block 510). The user device 106 may use a first equalizer, such as a LSIC equalizer, and compute the coefficients for the first equalizer (Block 512). If the normalized squared residual error for the LPDP channel estimate is not greater than the normalized squared residual error for the SPDP channel estimate (Block 508), the user device 106 sets the LPDP as the CPDP (Block 514). The user device 106 may use a second equalizer, such as a MMSE-DFE equalizer, and compute the coefficients for the second equalizer (Block 516).

The user device 106 may improve the reliability of decisions of a hypothesis test by using multiple independent observations, or alternately, correlated but not completely dependent observations. For example, if the hypothesis test is binary, the user device 106 may adopt a majority decision rule to choose between the hypotheses, referred to as a "compound test". The probability of detection for the compound test may be better than that for the individual tests, improving with the number N of individual tests used in combined.

A binary hypothesis test may make a hard-decision between hypotheses $H_0$ and $H_1$. The probability of detection error of either test may be defined asp, such that $0 \leq p < 0.5$. A compound test may be defined by applying the original test to a number of N observations, with N greater than one. The user device 106 may choose the hypothesis selected more often than the other by the individual tests, or a majority decision rule. For this compound test, the probability of detection error may be described by the following equations:

$$Pr(H_0 | H_1) = \sum_{i=\lfloor N/2 \rfloor}^{N} \binom{N}{i} p^i (1-p)^{N-i}, \text{ or}$$

$$Pr(H_1 | H_0) = \sum_{i=\lfloor N/2 \rfloor+1}^{N} \binom{N}{i} p^i (1-p)^{N-i}.$$

The false error probability for some typical values of p for different N may be shown in Table 1 below. Even with a p=0.4, applying the majority decision rule over 40 independent observations may bring the detection error probability to less than 8%.

TABLE 1

Probability of detection error for some typical values of p for different N.

| $Pr(H_0|H_1)$ | p = 0.4 | p = 0.3 | p = 0.2 | p = 0.1 |
|---|---|---|---|---|
| N = 20 | 0.128 | 1.71E−2 | 5.63E−4 | 7.08E−7 |
| N = 30 | 0.097 | 6.37E−3 | 5.24E−5 | 3.66E−9 |
| N = 40 | 0.074 | 2.42E−3 | 5.03E−6 | 1.96E−12 |

The individual tests may be obtained from independent observations over multiple data transmission bursts to create a multiburst history. The multiburst history may be a historical multiburst set of power delay profile decisions. Even with statistical correlation between observations, a compound test with a majority decision rule may give significant gains over simple tests. The channel and interference conditions may vary slowly over time, such as from low mobility of the user device 106. The user device 106 may correlate the channel estimation method decisions from successive bursts. For a first order Markov sequence of binomial random variables, the detection probability for the compound test may be derived in a straightforward manner.

A binary hypothesis test may make a soft-decision between hypotheses $H_0$ and $H_1$. A real-valued random variable X may have conditional means $E[X|H_0]=0$ and $E[X|H_1]=\mu$, and conditional variances both equal to $\sigma^2$. The hypothesis $H_1$ may be chosen if $X \geq \mu/2$, and the hypothesis $H_1$ may be chosen otherwise. A compound test may be designed with N independent observations $\{X_1, X_2, \ldots X_N\}$, such that $H_1$ may be chosen if $$Y = N^{-1} \sum_{n=1}^{N} X_n \geq \mu/2$$

and $H_0$ otherwise. By the law of large numbers, an asymptotic expression for detection error probability may be given by $Pr(H0|H1)=Pr(H1|H0) \approx Q(\mu\sqrt{N}/2\sigma) < e^{-\mu^2 N/8\sigma^2}$, with the function $$Q(x) = \int_x^\infty e^{-x^2/2} dx / \sqrt{2\pi}$$

and the bound $$Q(x) \leq \left(\frac{1}{2}\right) e^{-x^2/2}.$$

Combining the observations may improve detection, with the detection error scaling exponentially as −N. For the case of Gaussian X, an individual, or simple, test may have a detection error probability equal to $Q(\mu/2)$. The ratio of logarithms of the detection error probabilities in the asymptotic limit for the Gaussian case may be given by $$\frac{\log PR\{\text{Failure Detection (Compound Test)}\}}{\log PR\{\text{Failure Detection (Simple Test)}\}} = N.$$

This limit may be proved by making use of the lower bound $Q(x) > e^{-x^2/2}/x\sqrt{2\pi}$ along with the upper bound listed earlier.

Figure 6:
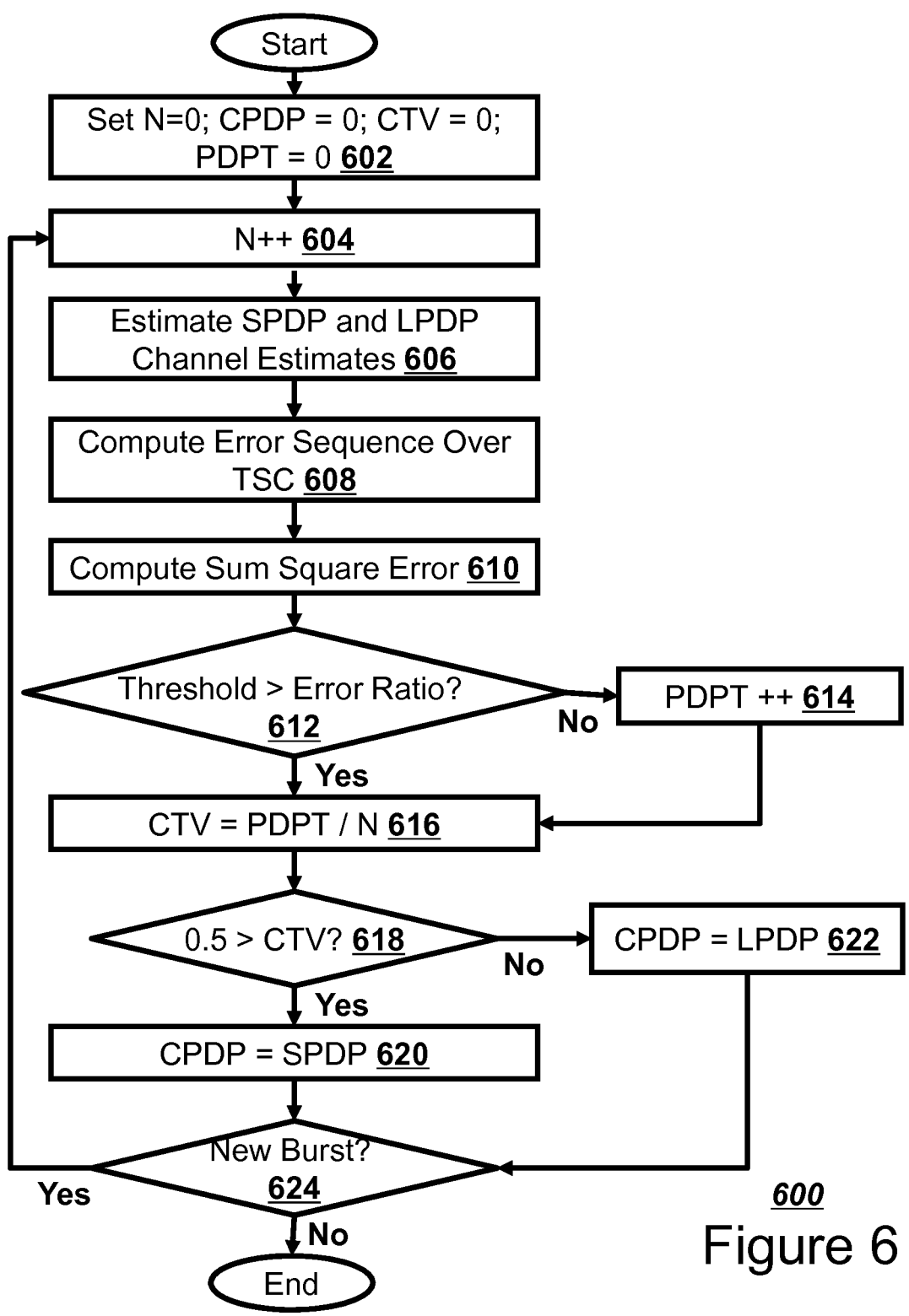
FIG. 6 illustrates, in a flowchart, one embodiment of a method for determining a power delay profile using a discrete historical archive.

FIG. 6 illustrates, in a flowchart, one embodiment of a method 600 for determining a power delay profile using a discrete historical archive. The user device 106 may create the compound test value by averaging the historical multiburst set of power delay profile decisions over a sequence of discrete-valued observations. The user device 106 may make an observation for each transmission burst. The user device 106 may set the number of observations (N), the CPDP, the compound test value (CTV), and the PDP tally (PDPT) to zero (Block 602). The user device 106 may increment N (Block 604). The user device 106 may form an SPDP channel estimate and a LPDP channel estimate for that burst (Block 606). The user device 106 may use the channel estimation methods embedded in the MMSE-DFE and the hybrid LSIC to form the channel estimates for the SPDP and the LPDP. The user device 106 may form channel estimates for more than two PDPs. For each estimate, the user device 106 may compute the associated error sequence over the known TSC symbols (Block 608). For each estimate, the user device 106 may compute an associated sum-squared error per symbol by normalization (Block 610). For two estimates, the user device 106 may set up the historical archive as a binary decision, for example, with one representing the choice of the LPDP channel estimate and zero representing the choice of the SPDP channel estimate. If the ratio of the sum-squared error for the SPDP channel estimate to the sum-squared error for the LPDP channel estimate, or error ratio, is not below a real value threshold (Block 612), the user device 106 may increment the PDPT (Block 614). If the error ratio is below a real value threshold (Block 612), the user device 106 may skip incrementing the PDPT. The user device 106 may set the CTV, or compound test value, equal to the PDPT divided by N (Block 616). If the CTV is below 0.5 (Block 616), or closer to zero than one, the user device 106 may set the CPDP channel estimate to be the SPDP channel estimate (Block 620). If the CTV is not below 0.5 (Block 616), or closer to one than zero, the user device 106 may set the CPDP channel estimate to be the LPDP channel estimate (Block 622). If a new burst occurs (Block 624), the user device 106 may increment N (Block 604).

Figure 7:
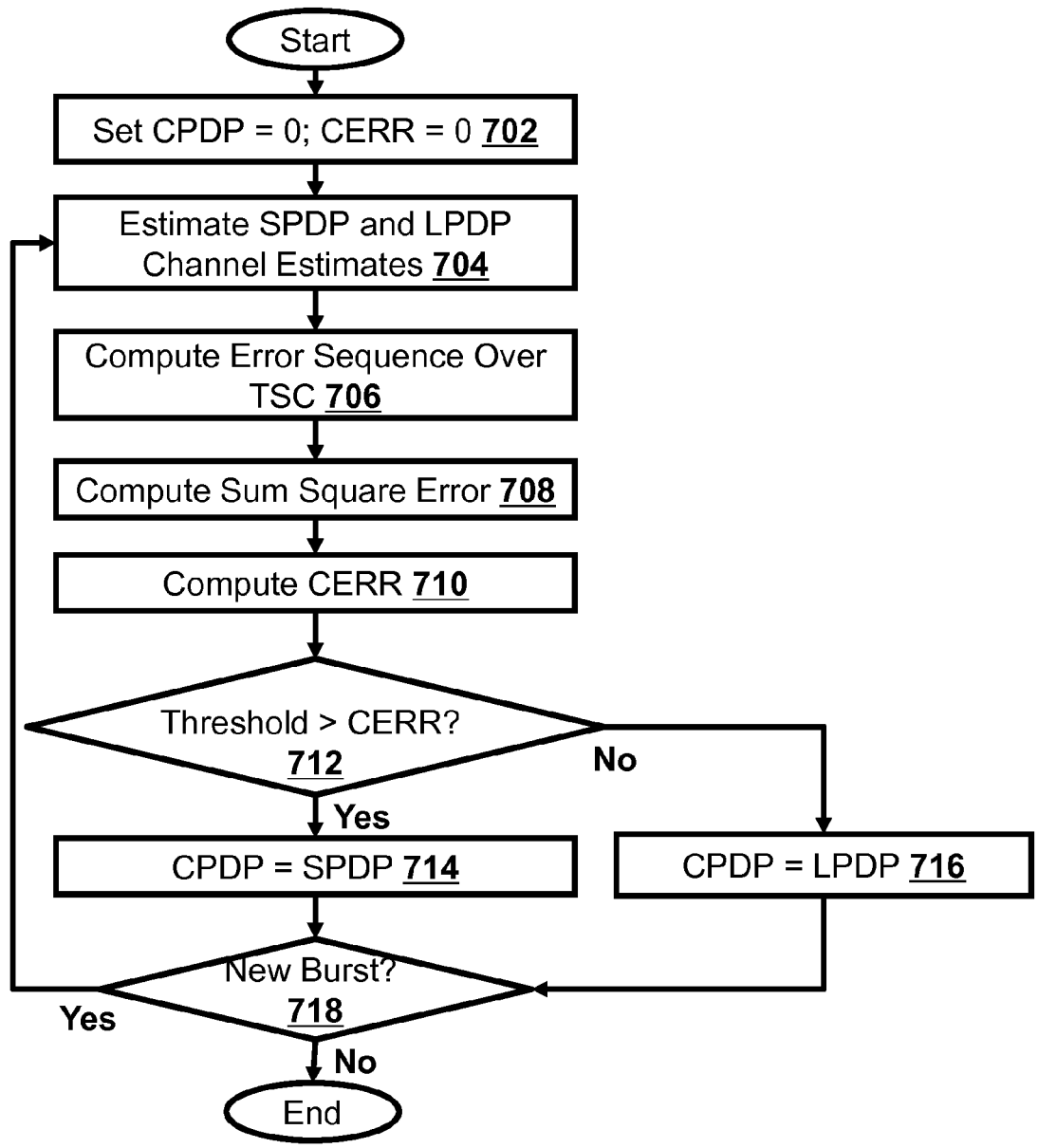
FIG. 7 illustrates, in a flowchart, one embodiment of a method for determining a power delay profile using a non-discrete historical archive.

FIG. 7 illustrates, in a flowchart, one embodiment of a method 700 for determining a power delay profile using a historical archive of non-discrete, or real-valued observations or measurements. The user device 106 may observe the historical multiburst set of non-discrete or real-valued PDP observations or measurements. The user device 106 may make an observation for each transmission burst. The user device 106 may set the CPDP channel estimate and the compound error ratio (CERR) to zero (Block 702). The user device 106 may form SPDP and LPDP channel estimates for that burst (Block 704). The user device 106 may use the channel estimation methods in the MMSE-DFE and LSIC equalizers to form the SPDP and LPDP channel estimates. The user device 106 may estimate more than two PDPs. For each estimate, the user device 106 may compute the associated error sequence over the known TSC symbols (Block 706). For each estimate, the user device 106 may compute an associated sum-squared error per symbol by normalization (Block 708). The user device 106 may calculate the CERR by adding a weighted sum squared error of the SPDP channel estimate to a tally of the sum-squared errors for the SPDP, or short error tally; adding a weighted sum squared error of the LPDP channel estimate to a tally of the sum-squared errors for the LPDP, or long error tally; and dividing the short error tally by the long error tally (Block 710). If the CERR is below a real value threshold (Block 712), the user device 106 may set the CPDP channel estimate to be the SPDP channel estimate (Block 714). If the CERR is not below a real value threshold (Block 712), the user device 106 may set the CPDP channel estimate to be the LPDP channel estimate (Block 716). If a new burst occurs (Block 718), the user device 106 may form new SPDP and LPDP channel estimates (Block 704).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for determining delay spread, comprising:
   storing a compound test value based on a historical multiburst set of power delay profile decisions;
   receiving a new transmission burst;
   creating a short power delay profile channel estimate and a long power delay profile channel estimate for the new transmission burst, wherein a delay spread of the long power delay profile channel estimate is larger than a delay spread of the short power delay profile channel estimate;
   combining each of the short power delay profile channel estimate and the long power delay profile channel estimate with the compound test value based on the historical multiburst for forming a new updated compound test value; and
   selecting a chosen power delay profile channel estimate from the short power delay profile channel estimate and the long power delay profile channel estimate, based on the new updated compound test value.

2. The method of claim 1, further comprising:
   correlating a training sequence code to a received signal to solve directly for the short power delay profile channel estimate.

3. The method of claim 1, further comprising:
   executing a least squares estimate on a received signal to create the long power delay profile channel estimate.

4. The method of claim 1, further comprising:
   using a first equalizer if the chosen power delay profile channel estimate is the short power delay profile channel estimate and a second equalizer if the chosen power delay profile channel estimate is the long power delay profile channel estimate.

5. The method of claim 4, wherein the first equalizer is a least squares interference cancellation equalizer and the second equalizer is a minimum mean squared error-decision feedback equalizer.

6. The method of claim 1, further comprising:
   creating the compound test value by averaging the historical multiburst set of power delay profile decisions over a sequence of discrete-valued observations.

7. The method of claim 1, further comprising:
   observing a historical multiburst set of real-valued power delay profile observations.

8. The method of claim 1, wherein a power delay profile decision in the historical multiburst set of power delay profile decisions is between a long test power delay profile and a short test power delay profile.

9. The method of claim 8, wherein the long test power delay profile is a hilly terrain profile and the short test power delay profile is a typical urban profile.

10. The method of claim 1, further including:
    weighting a power delay profile decision in the historical multiburst set of power delay profile decisions.

11. A mobile system for determining delay spread, comprising:
    a memory that stores a compound test value based on a historical multiburst set of power delay profile decisions;
    a processor that creates a short power delay profile channel estimate and a long power delay profile channel estimate for a new transmission burst which is received, where a delay spread of the long power delay profile channel estimate is larger than a delay spread of the short power delay profile channel estimate;
    wherein the memory further stores a new updated compound test value, based upon combining each of the short power delay profile channel estimate and the long power delay profile channel estimate with the compound test value based on the historical multiburst, when a new transmission is received; and wherein the processor further selects a chosen power delay profile channel estimate from the short power delay profile channel estimate and the long power delay profile channel estimate, based on the new updated compound test value.

12. The mobile system of claim 11, wherein the processor creates the compound test value by averaging the historical multiburst set of power delay profile decisions over a sequence of discrete-valued set of observations.

13. The mobile system of claim 11, wherein the processor creates the compound test value based on a historical multiburst set of real-valued power delay profile observations.

14. The mobile system of claim 11, wherein a power delay profile decision in the historical multiburst set of power delay profile decisions is between a long test power delay profile and a short test power delay profile.

15. The mobile system of claim 14, wherein the long test power delay profile is a hilly terrain profile and the short test power delay profile is a typical urban profile.

16. The mobile system of claim 11, wherein weighting a power delay profile decision in the historical multiburst set of power delay profile decisions.

17. A user device for determining delay spread, comprising:

a memory that stores a compound test value based on a multiburst history;

a processor that creates a short power delay profile channel estimate and a long power delay profile channel estimate for a new transmission burst which is received, where a delay spread of the long power delay profile channel estimate is larger than a delay spread of the short power delay profile channel estimate;

wherein the memory further stores a new updated compound test value, based upon combining each of the short power delay profile channel estimate and the long power delay profile channel estimate with the compound test value based on the historical multiburst, when a new transmission is received; and wherein the processor further selects a chosen power delay profile channel estimate from the short power delay profile channel estimate and the long power delay profile channel estimate, based on the new updated compound test value.

18. The user device of claim 17, wherein the processor correlates a training sequence code to a received signal to solve directly for the short power delay profile channel estimate.

19. The user device of claim 17, wherein the processor uses a least squares computation to create the long power delay profile channel estimate.

20. The user device of claim 17, wherein the processor creates the compound test value based on a historical multiburst set of real-valued power delay profile observations.

* * * * *